United States Patent [19]

Ritscher

[11] 4,331,644

[45] May 25, 1982

[54] COMBUSTION CATALYST AND PROCESS FOR USING SAME

[75] Inventor: James S. Ritscher, Ossining, N.Y.

[73] Assignee: Union Carbide Corporation, Danbury, Conn.

[21] Appl. No.: 37,030

[22] Filed: May 8, 1979

Related U.S. Application Data

[62] Division of Ser. No. 864,835, Dec. 27, 1977, Pat. No. 4,170,571.

[51] Int. Cl.³ .................. C01B 31/20; C10K 3/04; C10K 1/20
[52] U.S. Cl. .................. 423/437; 423/213.2; 423/245; 423/247
[58] Field of Search ............ 423/437, 245, 247, 213.2, 423/328

[56] References Cited

U.S. PATENT DOCUMENTS

| | | | |
|---|---|---|---|
| 3,346,328 | 10/1967 | Sergeys | 423/213.2 |
| 3,702,886 | 11/1972 | Argauer et al. | 423/328 |
| 3,709,979 | 1/1973 | Chu | 423/329 |
| 3,728,408 | 4/1973 | Tobias | 252/455 Z |
| 3,853,743 | 12/1974 | Schwartz | 252/455 Z |

*Primary Examiner*—Gary P. Straub
*Attorney, Agent, or Firm*—Richard G. Miller

[57] ABSTRACT

A unique class of copper zeolite combustion catalysts which are both highly siliceous and contain an extraordinary amount of zeolitic divalent copper cations which are prepared by ion exchanging the predominantly alkali metal cation form of ZSM-5 type zeolites with divalent copper cations and subjecting the resulting compositions to rigorous oxidation.

1 Claim, No Drawings

COMBUSTION CATALYST AND PROCESS FOR USING SAME

RELATED APPLICATIONS

This application is a division of pending application Ser. No. 864,835 filed Dec. 27, 1977, now U.S. Pat. No. 4,170,571 issued Oct. 9, 1979.

The present invention relates to a novel zeolite composition of matter suitable for use in catalyzing the combustion of carbonaceous substrates and to the combustion process per se. More particularly, the invention concerns a novel zeolitic copper aluminosilicate and its use as a catalyst in the oxidative combustion of hydrocarbons and carbon monoxide in pollution abatement processes.

It has heretofore been proposed to utilize a variety of copper-containing compositions to catalyze the oxidative combustion of carbonaceous substances in the vapor phase. Copper oxide, either alone or in combination with transition metal oxides, has long been employed as a catalyst in the oxidation of hydrocarbons. More recently the divalent copper ion in the form of a zeolitic cation has been found to have significant catalytic activity in the conversion of carbon monoxide to carbon dioxide. In U.S. Pat. No. 3,346,328, for example, it is proposed to use as the catalyst for treating internal combustion engine exhaust gases, a $Cu^{++}$ exchanged zeolite such as zeolite Y which has CuO loaded or held interstitially in its pore system. Since the copper ion is found to play an important part in hydrocarbon conversion and copper oxide is an influential factor in carbon monoxide conversion, the activity of the catalyst is optimized for a particular exhaust gas by varying the proportion of zeolitic $CU^{++}$ cations and impregnated CuO.

When it is desired to maximize the hydrocarbon combustion activity of zeolite base catalysts, the number of zeolitic copper cations has, prior to the present invention, been limited by the number of $AlO_4^-$ tetrahedra per unit cell of the zeolite crystal. This follows necessarily from the fact that zeolite cations exist in the zeolite structure only for the purpose of electrovalently balancing the framework tetrahedra. In zeolites which have molar $SiO_2/Al_2O_3$ ratios less than about 10, little difficulty is experienced in exchanging a sufficient number of the original monovalent zeolite cations to obtain an adequate concentration of divalent copper cations for catalysis purposes. Such alumina-rich zeolites, however, exhibit a much stronger affinity for water and other relatively polar molecules than for the weakly polar or non-polar hydrocarbon and CO substrates being oxidized. As a result, the catalytically active $CU^{++}$ sites of the zeolite soon become "poisoned" by the oxidation products and the rate of the desired combustion reaction is severly decreased unless the reaction system is maintained at prohibitively high temperatures or the catalyst is desorbed at impractically frequent intervals.

Advances in zeolite synthesis techniques, principally the substitution of organic amine-type cations for some or all of the alkali metal cations in conventional reaction gels, have resulted in the formation of zeolites having $SiO_2/Al_2O_3$ molar ratios in the range of greater than 10 up to 300 or greater, i.e. values at which the $AlO_4^-$ content appears to be crystallographically insignificant. Also improved methods for extracting $AlO_4^-$ tetrahedra from alumina-rich zeolites to create siliceous zeolite products have been developed. It is generally found that when the $SiO_2/Al_2O_3$ molar ratio exceeds about 20, there is a marked decrease in the hydrophilic nature of the zeolite and a commensurate increase in its organophilic nature. Accordingly, highly siliceous zeolites per se have been proposed as catalysts in processes in which organic molecules of low polarity are converted to more strongly polar products. Processes of this type are disclosed, for example, in U.S. Pat. No. 3,728,408 issued to M. A. Tobias on Apr. 17, 1973.

In the case of the more refractory hydrocarbons, however, the catalytic activity of the highly siliceous zeolite framework is not great enough to accomplish complete oxidative combustion using reasonable conditions of space velocity and temperature. Moreover, attempts to introduce catalytically effective amounts of $Cu^{++}$ cations into these alumina-poor zeolites have been generally unsuccessful for several reasons.

Firstly, the only known sources of copper cations suitable for introduction into the zeolite lattice by aqueous ion-exchange techniques are the water soluble salts of copper in which the copper cation is divalent. The tendency of each divalent $Cu^{++}$ cation is to balance the electrovalence of two $AlO_4^-$ tetrahedra, each formerly associated with a single monovalent cation. Thus, the relatively few $AlO_4^-$ tetrahedra in the zeolite are essentially halved in number insofar as providing a cation site to be occupied by $Cu^{++}$ cations is concerned. This places a premium on the use of zeolites with a relatively low $SiO_2/Al_2O_3$ molar ratio with the consequence that the essential hydrophobic or organophilic property cannot be maximized in the catalyst composition.

Secondly, upon dehydration, i.e. activation of $Cu^{++}$ exchanged high-silica zeolites such as acid-extracted zeolite Y, it is observed that there is a spontaneous conversion of the $Cu^{++}$ cations to the monovalent form and the formation of an equal number of cation sites occupied by protons. Not only are the monovalent $Cu^+$ cations not equivalent to $Cu^{++}$ cations with respect to combustion catalysis, but also there is a marked tendency for the monovalent copper cations to be reduced to elemental copper and consequent further loss of catalytic activity. Moreover, the $Cu^+$ zeolite cation readily forms a bidentate complex with two molecules of CO. One of the CO ligands is readily removable, but the resulting monodentate is extremely stable and requires heating at 200° C. under vacuum for dissociation.

There has now been discovered a unique class of copper zeolites which are both highly siliceous and contain an extraordinary amount of zeolitic divalent copper cations. The very high selectivity and hydrophobicity of these catalyst compositions make them ideally suited for use in the oxidative combustion of even the most refractory of hydrocarbons. These zeolite compositions have the crystal structure of the ZSM-5 type of aluminosilicates, at least 80% of the $AlO_4^-$ tetrahedra thereof being associated with, i.e. electrovalently neutralized by a zeolite divalent copper cation. The composition in the dehydrated state can be expressed empirically in terms of mole ratios of oxides as:

1.6–2.0 $Cu^{++}O$:0–0.2 $M_{2/n}O$:$Al_2O_3$:20–100 $SiO_2$ wherein "M" is at least one cation other than $Cu^{++}$, said composition having a characteristic X-ray powder diffraction pattern containing at least the following d-spacings:

TABLE I

| Interplanar Spacing, d(A) | Relative Intensity, I/I. |
|---|---|
| 11.1 ± 0.2 | S |
| 10.0 ± 0.2 | S |
| 7.4 ± 0.15 | W |
| 7.1 ± 0.15 | W |
| 6.3 ± 0.1 | W |
| (6.04 ± 0.1 | W |
| (5.97 | |
| 5.56 ± 0.1 | WW |
| 5.01 ± 0.1 | W |
| 4.60 ± 0.08 | W |
| 4.25 ± 0.08 | W |
| 3.85 ± 0.07 | VS |
| 3.71 ± 0.05 | S |
| 3.04 ± 0.03 | W |
| 2.99 ± 0.02 | W |

VS = Very Strong; S = Strong; W = Weak

These values were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these, the relative intensity values, 100 I/Io where Io is the intensity of the strongest line or peak, and d(obs.), the interplanar spacing in A, corresponding to the recorded lines, were calculated.

Preferably, the $SiO_2/Al_2O_3$ molar ratio of the present zeolite compositions is from about 40 to 85.

The class of zeolites referred to herein as ZSM-5 type includes not only ZSM-5 itself but also ZSM-11, ZSM-21 and other similarly behaving materials. U.S. Pat. No. 3,702,886 describing and claiming ZSM-5 is incorporated herein by reference.

ZSM-11 generally corresponds to the empirical formula:

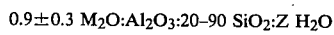

where M is at least one cation, n is the valence of M and Z is 6 to 12 in the "as produced" zeolite. The preferred M is alkali metal or alkyl ammonium or a mixture thereof, preferably sodium or tetraethylammonium. ZSM-11 is more particularly described in U.S. Pat. No. 3,709,979, the entire contents of which are incorporated herein by reference.

In a preferred synthesized form, the ZSM-21 zeolite has a formula, in terms of mole ratios of oxides and in the anhydrous state as follows:

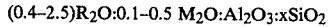

wherein R is an organic nitrogen containing cation, especially a cation derived from ethylenediamine, pyrrolidine or 2-(hydroxyalkyl) trialkylammonium compounds, wherein alkyl is methyl, ethyl or a combination of the two, M is an alkali metal, especially sodium, and x is from greater than 10 to about 50.

Reference is made to U.S. Pat. No. 3,756,942, for a more complete description of the various specific catalysts in the ZSM-5 class and for methods of preparing such.

In general, some zeolite molecular sieves have in the past been characterized as shape selective, that is, having pore openings so sized and shaped as to admit substantially only normal paraffins into their internal pore structure, or non-shape selective or large pored, that is having pore openings so sized and shaped as to admit substantially any configuration of organic compound into their internal pore structure. It has become usual in this art to refer to shape selective zeolites as those having pore openings of about 5 to 7 Angstrom units or less and to non-shape selective zeolites as those having pore openings of about 11 Angstrom units or more.

The ZSM-5 type of zeolite molecular sieve seems to differ from these other materials in that it is shape selective not only for normal paraffins but for slightly branched, e.g. methyl substituted, paraffins as well.

The ZSM-5 type of zeolite also appears to be unique in its ion exchange properties with respect to aqueous ion exchange media containing divalent copper cations. As is evident from the empirical formula set forth above, if the zeolite $Cu^{++}$ cations known to be present in the present zeolite compositions were associated with the $AlO_4^-$ tetrahedra in the conventional manner, they would represent from 160 to 200% of the theoretical maximum. Although cation populations somewhat in excess of the theoretical maximum can be attributed to analytical tolerances and impurities in the zeolite composition, other explanations must be provided for values which appear to deviate from the norm as greatly as in the present compositions.

Although not wanting to be bound by any particular theory, the available evidence suggests that the divalent $Cu^{++}$ zeolitic cations in the present zeolites in the as ion-exchanged and unactivated state, are largely hydroxylated cations and are bonded to the zeolite structure through a single copper-to-zeolite bond, i.e. $CuOH^+$. This is supported by the fact that the copper cations in this state do not react with CO as monovalent $CU^+$ zeolite cations are known to do. Also upon vacuum activation at temperatures above about 300° C., these putative hydroxylated $Cu^{++}$ cations are converted to $Cu^+$ zeolite cations as evidenced by their reactivity with CO to form the bidentate complex:

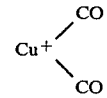

In the unactivated, as-ion-exchanged state, the copper cations which are not present as divalent hydrated species have been established to be essentially monovalent $CU^+$ zeolitic cations by ESR techniques in conjunction with CO reactivity studies. Thus upon dehydration (activation) of the copper exchanged zeolite there is created a form in which substantially all of the copper cations are monovalent and each is associated with a single $AlO_4^-$ tetrahedron. To obtain the required divalent $Cu^{++}$ cation form it is found that when the monovalent $Cu^+$ form is contacted at ambient room temperature (22° C.) with a strong oxidant such as chlorine, ozone or $NO_2$, preferably $NO_2$ or a mixture of $NO_2$ and $O_2$, an essentially stoichiometric conversion to the $Cu^{++}$ form occurs. It can be surmised that these copper-containing cations are, at least in the case where $NO_2$ is the oxidant, somewhat analogous in structure to the hydroxylated divalent copper cations of the unactivated precursor wherein the $NO_2$ moiety functions in a similar manner to the hydroxyl group in that case. The same results are obtained in the $NO_2$ plus $O_2$ treatment is simultaneous with the activation (dehydration) of the as-exchanged form of the zeolite.

Accordingly, the present compositions contain copper cations which are both divalent, zeolitic in nature and present in concentrations per AlO4⁻ tetrahedra approximately 160 to 200 percent of that which are obtained by conventional ion exchange of other zeolite compositions.

In preparing the compositions of the present invention it is essential that the ZSM-5 type zeolite starting material has at least 80, and preferably at least 90 percent of its AlO4⁻ tetrahedra associated with alkali metal, preferably lithium, potassium or sodium cations. It is found that even if the requisite number of AlO4⁻ are associated with exchangeable cations other than alkali metal, e.g. H+, Ca++, NH4 or Ba, the compositions of the present invention are not produced. It can be theorized that the unique crystal structure of the ZSM-5 type zeolite together with the basic (as opposed to acidic) character of the sodium cation sites may create localized pH conditions favorable to the formation of hydroxylated divalent copper cations, but the validity of this proposition has not been established with certainty.

As disclosed in U.S. Pat. No. 3,702,886, the zeolite species can be synthesized in a form which the zeolitic cations are a mixture of tetrapropylammonium and sodium cations. The concentration of tetrapropylammonium cations in the as-synthesized product is approximately proportional to their relative concentration in the reaction gel with respect to the sodium cations also present. The tetrapropylammonium cations, at least in part because of molecular size considerations, cannot be ion exchanged from the crystal lattice. However, where it is necessary to insert sodium cations into at least some of the sites occupied by the tetramethylammonium species the technique for removing organic cations described in U.S. Pat. No. 3,853,743, A. B. Schwartz, can be employed. This procedure comprises heating the organic cation-containing zeolite at a temperature between about 500° F. and about 1,000° F. in an atmosphere of ammonia or mixtures thereof with nitrogen for a period of 10 minutes to 10 hours. These conditions prevent loss of crystallinity and preserve the cationic sites in the zeolite which can then become occupied by sodium cations upon conventional ion exchange with an aqueous sodium salt solution. The disclosure of U.S. Pat. No. 3,853,743 is incorporated herein by reference.

A ZSM-5 type zeolite, as defined herein, can be prepared free of organic cations and having substantially all sodium cations by the hydrolthermal conversion at 80° C., to 210° C., for 40 to 200 hours under autogeneous pressure of a reaction gel having a composition in terms of mole ratios of oxides within the following range:

SiO2/Al2O3 = 10 to 100
Na2O/SiO2 = 0.04 to 1.5
H2O/Na2O = 20 to 600

It will be understood, however, that this synthesis process is not a part of the present invention. It is described in greater detail in co-pending application Ser. No. 655,065 filed Feb. 4, 1976, the disclosure of which is incorporated herein by reference in its entirety.

The ion-exchange procedure for transforming the sodium cation form of the ZSM-5 type starting materials defined hereinbefore is readily accomplished using commonly available copper salts such as CuCl2, CuSO4 and cupric acetate in an aqueous medium. A satisfactory procedure comprises contacting at reflux temperature the starting zeolite with 25 ml. per gram at an aqueous solution containing the cupric salt in a concentration of 0.4 mole per liter of water. Contact is maintained for about 3 hours, and then the procedure is repeated two more times using fresh ion exchange medium. In washing the final zeolite product with distilled water to remove extraneous salts, care should be taken to avoid overwashing and consequent H+ exchange of the copper cation-containing product. Advantageously the pH of the washing water should not be lower than 6.3.

Conversion of the as-exchanged copper ZSM-5 type zeolite to the novel composition of the present invention is accomplished by contacting same with a strong oxidant, preferably NO2 alone or in an admixture with oxygen, either during or after activation (dehydration) to remove adsorbed water. The relative proportions of oxidant NO2 and zeolite is not a narrowly critical factor, but at least one oxidant molecule should be present for each cation site of the zeolite. As a practical matter a large stoichiometric excess of oxidant will oridinarily be used. It is found that an air atmosphere containing 20 mole percent NO2 is ideal for the purpose. Temperatures of from 20° C. to 375° C. have been found to be satisfactory: Pressure conditions are not a critical factor.

It is preferred to contact the zeolite with the oxidant after the bulk of the adsorbed water is removed but before total dehydration occurs. This procedure suppresses the formation of intermediate Cu+ cations and retains the initially present hydroxylated Cu++ cations in the divalent state. Upon dehydroxylation of the original CuOH+ cation species and the formation of Cu+ cations, it is possible, however, to again form the divalent copper cation species by oxidation, preferably by contact with NO2 at ambient room temperature.

The preparation and utilization of the compositions of the present invention are illustrated by the following examples:

EXAMPLE 1

A reaction mixture was prepared by dissolving 1.2 g. of NaOH and 0.6 g NaAlO2 (30.2 wt.-% Na2O, 44.1 wt.-% Al2O3, 24.3 wt.-% H2O) in 25 g. of hot H2O and adding with stirring to 44 g. of aqueous colloidal silica sol (30 wt.-% SiO2) in 100 g. of H2O. The overall molar oxide composition was:

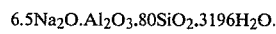

6.5Na2O.Al2O3.80SiO2.3196H2O.

The reactant mixture was placed in a polytetrafluoroethylene-lined autoclave and maintained at about 200° C. and autogenous pressure for about 72 hours. The solid product was separated by filtration, washed with H2O and dried at 110° C. Chemical analysis of a sample of this product gave the following composition: 1.9 wt.-% Na2O, 2.7 wt.-% Al2O3, 89.2 wt.-% SiO2, 5.5 wt.-% H2O. The molar composition was, in terms of oxides:

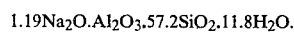

1.19Na2O.Al2O3.57.2SiO2.11.8H2O.

A portion of the product was activated at 350° C. in vacuum for about 16 hours in a McBain-Bakr gravimetric adsorption system. The activated zeolite adsorbed 8.2 wt.-% O2 at 750 torr, −183° C.; 3.9 wt.-% isobutane at 750 torr, 23° C.; 0.3 wt.-% neopentane at 750 torr, 23° C.; and 7.7 wt.-% H2O at 20 torr, 23° C. The X-ray powder diffraction pattern of the zeolite product is set forth in Table II, below:

TABLE II

| d-A | I |
| --- | --- |
| 11.2 | 15 |
| 10.16 | 24 |
| 9.82 | 4 |
| 9.02 | 4 |
| 7.44 | 1 |
| 7.02 | 1 |
| 6.66 | 1 |
| 6.37 | 2 |
| 5.98 | 4 |
| 5.72 | 3 |
| 5.57 | 2 |
| 5.37 | 1 |
| 5.10 | 1 |
| 5.01 | 3 |
| 4.60 | 1 |
| 4.51 | 1 |
| 4.37 | 4 |
| 4.08 | 1 |
| 4.00 | 4 |
| 3.85 | 41 |
| 3.82 | 27 |
| 3.74 | 15 |
| 3.72 | 10 |
| 3.65 | 5 |
| 3.60 | 1 |
| 3.45 | 6 |
| 3.25 | 2 |
| 3.19 | 2 |
| 3.15 | 1 |
| 3.06 | 3 |
| 3.00 | 4 |
| 2.95 | 1 |

The non-activated portion of the zeolite product was slurried for 3 hours at reflux temperature in an aqueous solution containing 0.4 mole of $CuCl_2$ per liter of water. Sufficient solution was used to provide 0.01 mole of $CuCl_2$ per gram of zeolite present. At the end of the 3 hour period, the zeolite was isolated by filtration and the procedure repeated two more times. The copper ion-exchanged product was washed chloride-ion free using distilled water having a pH of 6.3, and dried in air at 100° C. Conversion of the $Cu^+$ cations present to zeolite $Cu^{++}$ containing cations was accomplished by passing a stream of dry air containing 20 mole percent $NO_2$ over the zeolite for a period of 2 hours. The final dehydrated composition in terms of mole ratios of oxides was:

$1.86Cu^{++}O:0.20Na_2O:Al_2O_3:SiO_2$.

EXAMPLE 2

The $Cu^{++}$ ZSM-5 type zeolite prepared as in Example 1 was compared with a conventional commercial combustion catalyst in toluene combustion. The comparison catalyst was a copper carbonate—manganese carbonate mixture supported on a Bentonite clay basis. Upon heating the copper carbonate decomposes to CuO. The chemical composition of the catalyst in terms of oxides was:

| Component | Wt.-% Volatile-Free Basis |
| --- | --- |
| $Al_2O_3$ | 3.3 |
| $SiO_2$ | 9.9 |
| $Na_2O$ | 0.6 |
| MnO | 37.7 |
| CuO | 47.7 |
| CaO | 0.2 |
| $Fe_2O_3$ | 0.6 |

The zeolite catalyst composition contained about one tenth of the number of active cation sites as the commercial nonzeolite catalyst. Both catalyst comositions were pelleted and placed in quartz tubular reactors 2.5 cm. ID×30 cm. long equipped with variable heating means and thermocouples to measure the temperature at various points in the catalyst mass. A gas stream composed of eight parts by volume helium, two parts oxygen and 0.05 parts toluene was passed through each reactor at a space velocity of 10,000 hr.$^{-1}$. The combustion results are shown in tubular form below. Unless otherwise indicated the catalyst masses sustained adiabatic combustion at the temperature indicated.

TABLE III

| Minimum Preheat Temp., °C. Required: | $Cu^{++}$ ZSM-5 Type | Commercial Catalyst |
| --- | --- | --- |
| For Fresh Catalyst to Initiate Combustion | 150 | 150 |
| For Complete Combustion by Fresh Catalyst | 220 | 220 |
| To Initiate Combustion After Catalyst Exposed to 100% Humidity for 1.0 Hours | 150 | 180 |
| For Complete Combustion After Catalyst Exposed to 100% Humidity for 1.0 Hours | 220 | 220$^a$ |
| To Initiate Combustion by Catalyst Exposed to 800° C. for 4.0 Hours | 150 | 230 |
| For Complete Combustion by Catalyst Exposed to 800° C. for 4.0 Hours | 250$^a$ | 360$^a$ |

$^a$No longer sustained adiabatic combustion.

EXAMPLE 3

The catalytic activity of the zeolite catalyst of Example 1 was compared with that of a ZSM-5 zeolite catalyst which was prepared by ion-exchange of a starting zeolite which contained less than 80 percent of its alumina tetrahedra associated with sodium cations. The ZSM-5 zeolite was prepared as follows: Twenty grams of NaOH and 24 grams of sodium aluminate ($NaAlO_2$) were dissolved in 150 grams of water. A second solution was prepared by dissolving 106 grams of tetrapropylammonium bromide in 150 grams of water. The first solution was then added to and blended with a slurry of 1760 grams of aqueous silica sol (30 wt.-% $SiO_2$) in 700 grams of water, and finally the second solution was added and blended well. The resulting gel having a composition in terms of mole ratios of oxides of:

$1.8TPA_2O:3.5Na_2O:Al_2O_3:80SiO_2:1150H_2O$ was then digested at 200° C. for about 77 hours and the crystalline zeolite product isolated by filtration, washed and dried. The as-synthesized product had a composition in terms of mole ratios of oxides on an anhydrous basis:

$0.75Na_2O:0.25TPA_2O:Al_2O_3:80.6SiO_2$

The composition was calcined at 600° C. to decompose the organic cations and then ion-exchanged using the following procedure: To a solution of 6.72 grams (10 fold excess) of cupric chloride in 250 ml. distilled water was added 10 grams of calcined ZSM-5 zeolite. After refluxing with stirring for 3 hours the mixture was filtered, the solids returned to the flask and the exchange repeated using fresh cupric chloride solution. The filtered solids were washed once by stirring with water for 1 hour, then filtered and dried in racuo at 100° C. Analysis by "aa" showed 1.09 wt.-% Cu, 0.02 wt.-% Na and 6.0 wt.-% LOI at 1000° C., thus indicating a Cu++ ion-exchange of 92 percent of theory.

Using essentially the same apparatus and technique set forth in Example 2, it was found that the activity of the catalyst composition of Example 1 resulted in 100% combustion of toluene to $CO_2$ at 300° C. in a reaction that began initially at 150° C. In marked contrast, the comparison zeolite catalyst prepared in this Example 3 did not initiate combustion until a temperature of 200° C. was reached, and resulted in a 63 percent oxidation to $CO_2$ at 350° C. Also significant amounts of hydrocarbon degradation products, principally benzene, were detected in the emission from the reactor in the case of the comparison catalyst.

EXAMPLE 4

The catalyst of Example 2 was compared with a Cu++ exchanged type-Y zeolitic catalyst in the combustion of ethane. The type-Y zeolite was a steam stabilized composition having the chemical composition (anhydrous basis):

$$0.04Na_2O:0.93CuO:Al_2O_3:31.4SiO_2$$

and was prepared by conventional ion exchange using 13.4 g. $CuCl_2$ in 250 ml. water (5-fold excess of Cu++). Using essentially the same apparatus and techniques set forth in Example 2, it was found that the type-Y catalyst at 350° C. converted 23 wt.-% of the ethane to $CO_2$, 5 wt.-% to CO and 1 wt.-% to ethylene. At 300° C. and otherwise under the same conditions, the catalyst of Example 1 converted 40 wt.-% of the ethane to $CO_2$, and produced no CO and only trace amounts of ethylene.

EXAMPLE 5

The Cu++ ZSM-5 type zeolite prepared as in Example 1 was used to combust a variety of common organic solvents of widely varying structure. The apparatus and procedure described in Example 3 were used with the exception that the concentration of solvent vapor was maintained below 0.05 parts by volume, or sufficiently dilute as to preclude adiabatic combustion. The results are shown in tubular form below. In no case were products of partial combustion or coking observed.

TABLE IV

| Solvent | Minimum Temp. for 100% Combustion (°C.) | Ignition Point (°C.) |
|---|---|---|
| Toluene | 380 | 190 |
| Xylene | 370 | 190 |
| Methyl Ethyl Ketone | 330 | 190 |
| Methyl Isobutyl Ketone | 370 | 140 |
| Isopropanol | 380 | 190 |
| CELLOSOLVE Solvent | 350 | 190 |
| Methyl CELLOSOLVE Acetate | 320 | 190 |
| Mineral Spirits | 340 | 210 |

What is claimed is:

1. Process for oxidatively combusting a chemical compound selected from the group consisting of hydrocarbons, carbon monoxide and oxygenated hydrocarbons which comprises contacting said compound in admixture with oxygen at a temperature of from 100° C. to 450° C. with a copper zeolite having in the dehydrated state a composition in terms of mole ratios of oxides as:

$$1.6-2.0Cu^{++}:0.0-0.2M_{2/n}O:Al_2O_3:20-100SiO_2$$

wherein M is at least one cation other than Cu++ having a valence of "n", said zeolite composition having a characteristic X-ray powder diffraction pattern containing at least the d-spacings of Table I.

* * * * *